UNITED STATES PATENT OFFICE.

RUDOLF ADLER, OF AMSTERDAM, NETHERLANDS, ASSIGNOR TO NAAMLOOZE VENNOOTSCHAP "HOLLANDSCHE PROTEÏNE MAATSCHAPPIJ," OF AMSTERDAM, NETHERLANDS, A LIMITED COMPANY OF NETHERLANDS.

ART OF MAKING PLASTIC COMPOSITIONS.

1,169,756.     Specification of Letters Patent.     Patented Feb. 1, 1916.

No Drawing.     Application filed March 29, 1913. Serial No. 757,614.

*To all whom it may concern:*

Be it known that I, RUDOLF ADLER, doctor, chemist, subject of the Emperor of Austria-Hungary, residing at Amsteldijk 46, Amsterdam, Netherlands, have invented certain new and useful Improvements in the Art of Making Plastic Compositions, of which the following is a specification.

A process has already been proposed to manufacture artificial silk and other formed articles from milk. This process consisted essentially in decomposing the albumens of the milk by means of pyro-phosphate salts and converting into the plastic form the product of the decomposition of the albumen remaining in solution after it has been precipitated by means of acid after an addition of alkali. The articles thus produced are then hardened in the usual manner by means of formaldehyde or other agent. When it is desired to form plastic masses according to that process, then it is necessary to convert into the plastic form the material (which has been precipitated by means of acid and alkali) with ammonia or other agent having an alkaline reaction. This method has the disadvantage that the formed material retains very tenaciously the water that is contained in the mass, and this has the further result that the formed articles take a very long time to become completely dry, while the alkali which cannot be eliminated by even the greatest pressure, entails a greater or less solubility of the dried article. These drawbacks of the aforesaid process are avoided by the improved process hereinafter described which forms the subject of the present invention. It has been discovered that the formed articles can be dried quickly if there are incorporated with the mass such carbo-hydrates as will completely dissolve in the albuminous mass in the presence of ammonia, and that after drying, if necessary after previous precipitation of the mass by means of acid, the formed articles will have lost their solubility in water without further chemical treatment. These cellulose solutions in ammoniacal cupric oxid or zinc chlorid which are usually employed in the art cannot be employed for the present purpose because the necessary subsequent treatment with acid or alkaline substances would have a decomposing action upon the added albuminous bodies. For the same reason an addition of viscose is also not suitable. The fatty acid esters of cellulose are also not suitable for the present purpose because they cannot be dissolved under the conditions of the present process. Consequently the cellulose derivatives which can be employed for the present process must have properties different from those of the above mentioned cellulose solutions which consist in that they are caused by the addition of small quantities of ammonia to dissolve readily in the albuminous mass, and on the other hand after drying the formed articles without any chemical treatment lose their solubility in water or dilute ammonia. I have now discovered that these conditions are satisfied by certain oxy-celluloses. Especially suitable for the present improved process are more particularly those oxy-celluloses which are produced by the action of dilute nitric acid upon cellulose. The important and for the present process essential property of those substances consists in that they can be readily and completely dissolved even in dilute ammonia and that they lose this solubility after drying at 60 to 80° C.

Milk may be employed as the raw material for carrying out the present improved process but instead of milk there may also be employed the albumens or albuminous substances such as albumin, glutin, and especially casein, which may be produced by known methods, and which are readily soluble in ammonia. Coloring matters or substances for giving bulk may be added as usual.

The manner of carrying out the present improved process and its operation will now be described by means of two examples.

Example 1: 5 kilograms of casein are rubbed up into a stiff paste with the smallest possible quantity of strong ammonia. On the other hand the oxy-cellulose produced according to a known process (for instance that of Cross and Bevan, *Journ. Soc. Chem.* 43, p. 22; or *Journal of the Chemical Society,* vol. 71, p. 1090; or Sacc, *Journ. f. Prakt. Chemie,* 46, p. 430, etc.) is now dissolved in the smallest possible quantity of concentrated ammonia and the solution is well mixed by means of a stirring device with the above mentioned ammoniacal casein paste. By this means there is gradually produced a transparent mass which is formed into articles in the usual manner for instance by great pressure. The resulting articles are now hardened by means of formaldehyde or another agent, dried at a low temperature until a transparent mass is produced, and then subjected according to the size of the formed article for two or ten hours to a temperature of 60 to 80° C.

Example 2: 6 kilograms of casein are rubbed up in a strong solution of ammonia and the resulting paste is diluted with water—(about 20 liters). On the other hand 3 kilograms of oxy-cellulose dissolved in ammonia are likewise diluted with water (about 40 liters) and added to the casein solution. The resulting liquid, filtered if required, is neutralized by means of acid to the exact degree of its contained ammonia, the precipitate is washed in water until it is free from salt, and is then treated further as stated in Example 1.

What I claim is:

1. In the art of making plastic compositions the process which comprises mixing ammonia with an albuminous substance and oxy-cellulose.

2. In the art of making plastic compositions, the process which comprises mixing an ammoniacal composition of an albuminous substance with an ammoniacal composition of oxy-cellulose.

3. In the art of making plastic compositions, the process which consists in mixing an ammoniacal composition of an albuminous substance with an ammoniacal composition of oxy-cellulose, forming the desired article therefrom, and drying the said formed article, at a low temperature.

4. In the art of making plastic compositions, the process which comprises mixing an albuminous substance with ammonia and diluting the mixture with water, dissolving oxy-cellulose in ammonia and diluting the solution with water, and combining the mixture of the albuminous substance with the oxy-cellulose solution.

5. In the art of making plastic compositions, the process which consists in mixing an albuminous substance with ammonia and diluting the mixture with water, dissolving oxy-cellulose in ammonia and diluting the solution with water, and combining the mixture of the albuminous substance with the oxy-celluose solution, subjecting the mixture to precipitation, forming the desired article from the precipitate, and drying the same.

6. In the art of making plastic compositions, the process which consists in mixing an albuminous substance with ammonia and diluting the mixture with water, dissolving oxy-cellulose in ammonia and diluting the solution with water, and combining the mixture of the albuminous substance with the oxy-cellulose solution, and acidifying the combined solution to form a precipitate.

7. In the art of making plastic compositions, the process which consists in mixing an albuminous substance with ammonia and diluting the mixture with water, dissolving oxy-cellulose in ammonia and diluting the solution with water, and combining the mixture of the albuminous substance with the oxy-cellulose solution, acidifying the combined solution to form a precipitate, forming the precipitate into the desired article and drying the same.

8. In the art of making plastic compositions, the process which consists in mixing an ammoniacal composition of an albuminous substance with an ammoniacal composition of oxy-cellulose, forming the desired article therefrom, then hardening the said formed article and drying the same.

9. In the art of making plastic compositions, the process which consists in mixing an albuminous substance with ammonia and diluting the mixture with water, dissolving oxy-cellulose in ammonia and diluting the solution with water, and combining the mixture of the albuminous substance with the oxy-cellulose solution, forming the desired article therefrom, then hardening the said formed article and drying the same.

10. In the art of making plastic compositions, the process which consists in mixing an albuminous substance with ammonia and diluting the mixture with water, dissolving oxy-cellulose in ammonia and diluting the solution with water, and combining the mixture of the albuminous substance with the oxy-cellulose solution, acidifying the combined solution to form a precipitate, forming the precipitate into the desired article and then hardening the said formed article and drying the same at a low temperature.

11. A new composition of matter comprising an albuminous substance incorporated with oxy-cellulose.

12. A new composition of matter comprising an albuminous substance which is soluble in ammonia and incorporated with oxy-celluose.

13. A new composition of matter comprising an albuminous substance which is soluble in ammonia and incorporated with oxycellulose, the whole being hard and dry.

14. A new composition of matter comprising an albuminous substance which is soluble in ammonia and incorporated with oxycellulose, the whole being hard and dry, and insoluble in water and dilute ammonia.

In testimony whereof I have hereunto set my hand in presence of two subscribing witnesses.

Dr. RUDOLF ADLER.

Witnesses:
P. ALDERING,
WILLI REESER.